United States Patent
Lam et al.

(10) Patent No.: US 6,954,272 B2
(45) Date of Patent: Oct. 11, 2005

(54) APPARATUS AND METHOD FOR DIE PLACEMENT USING TRANSPARENT PLATE WITH FIDUCIALS

(75) Inventors: Michelle T. Lam, Gilbert, AZ (US); Nathan C. McDaniel, Chandler, AZ (US); Gary M. Barnes, Phoenix, AZ (US); Rene Cruz, Avondale, AZ (US)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 10/052,091

(22) Filed: Jan. 16, 2002

(65) Prior Publication Data

US 2003/0133116 A1 Jul. 17, 2003

(51) Int. Cl.[7] .......................... G01B 11/00; G01B 11/26; G01B 9/08; G06K 9/00; H01L 23/48
(52) U.S. Cl. ...................... 356/401; 356/138; 356/153; 356/397; 382/145; 382/147; 257/737
(58) Field of Search ............... 356/138, 139.04–139.06, 356/153, 396, 394, 395, 397, 401; 382/145, 147; 257/737, 782, 783, 797; 73/865.8; 156/378

(56) References Cited

U.S. PATENT DOCUMENTS

| | | | | |
|---|---|---|---|---|
| 4,776,088 A | * | 10/1988 | Biggs et al. |
| 5,537,204 A | * | 7/1996 | Woodhouse |
| 6,055,049 A | * | 4/2000 | Mueller |
| 6,085,573 A | * | 7/2000 | Larson |
| 6,134,975 A | * | 10/2000 | Keil |
| 6,214,525 B1 | * | 4/2001 | Boyko et al. |
| 6,487,083 B1 | * | 11/2002 | Kwong |

* cited by examiner

*Primary Examiner*—Frank G. Font
*Assistant Examiner*—Khaled Brown
(74) *Attorney, Agent, or Firm*—Schwegman, Lundberg, Woessner & Kluth, P.A.

(57) ABSTRACT

A transparent plate with fiducials for aligning and placing of dies on a panel with a high degree of accuracy is disclosed. The locations of the fiducials correspond to desired die locations. The transparent plate is arranged beneath the panel, with the fiducials aligned with cavities formed in the panel. The cavities have transparent bottoms. A die alignment mark on a die residing over the panel is used to establish the position of the die. Imaging a fiducial associated with a cavity is used to center the die with respect to the cavity. Accurate placement of the fiducials is accomplished by electron-beam lithography.

22 Claims, 6 Drawing Sheets

APPARATUS AND METHOD FOR DIE PLACEMENT USING TRANSPARENT PLATE WITH FIDUCIALS

FIELD OF THE INVENTION

The present invention relates to integrated circuit (IC) packaging, and in particular relates to performing accurate die placement in IC packaging.

BACKGROUND OF THE INVENTION

The manufacturing of electronic and optoelectronic integrated circuits (ICs) involves complex lithographic processes to form microscopic solid-state devices and circuits in semiconductor wafers. These lithographic processes typically include forming layers of material on the wafer, patterning the layers, doping the substrate and/or the patterned layers, and heat-treating (e.g., annealing) the resulting structures. These processes are repeated to build up the IC structure. The result is a wafer containing a large number of ICs.

A "wafer sort" is then performed, wherein each IC chip on the wafer is electrically tested for functionality. The wafer is then separated ("diced") into the individual IC chips, which are then "packaged" individually or in groups for incorporation onto a "panel," e.g., a printed circuit board (PCB) or motherboard.

The packaged dies (or "dies" for short) must be placed in specific locations on the panel to within a given accuracy so that interconnections between the dies can be successfully established. To this end, the panel includes alignment marks or "fiducials" to assist in achieving the desired placement accuracy. The dies are placed on the panel by a die placement machine, sometimes referred to as a "chip shooter." The machine includes an optical vision system that locates and recognizes the fiducials as well as an alignment mark on the die. Information from the optical vision system relating to the position of the die relative the fiducials allows the die to be placed on the panel at a specific location.

This die placement process provides a die placement accuracy no better than about 25 microns (3 sigma). The main factor limiting the accuracy of the die placement process is the error in the placement of fiducials on the panel. To date, a placement accuracy of 25 microns (3 sigma) has been satisfactory for most die placement applications. However, for certain new packaging applications, a die placement with much greater accuracy (e.g., 2 microns, 3 sigma) is required. For example, in bump lithography, once the dies are mounted to the panel, further lithography steps are carried out. In particular, a print solder resist layer is deposited, and then plate metal (e.g., copper) traces are formed to establish the electrical connections between the dies. Without highly accurate die placement on the panel, the subsequent lithography steps cannot be successfully performed.

Accordingly, what is needed is a die placement apparatus and method that provides for greater die placement accuracy.

DETAILED DESCRIPTION OF THE INVENTION

In the following detailed description of the embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
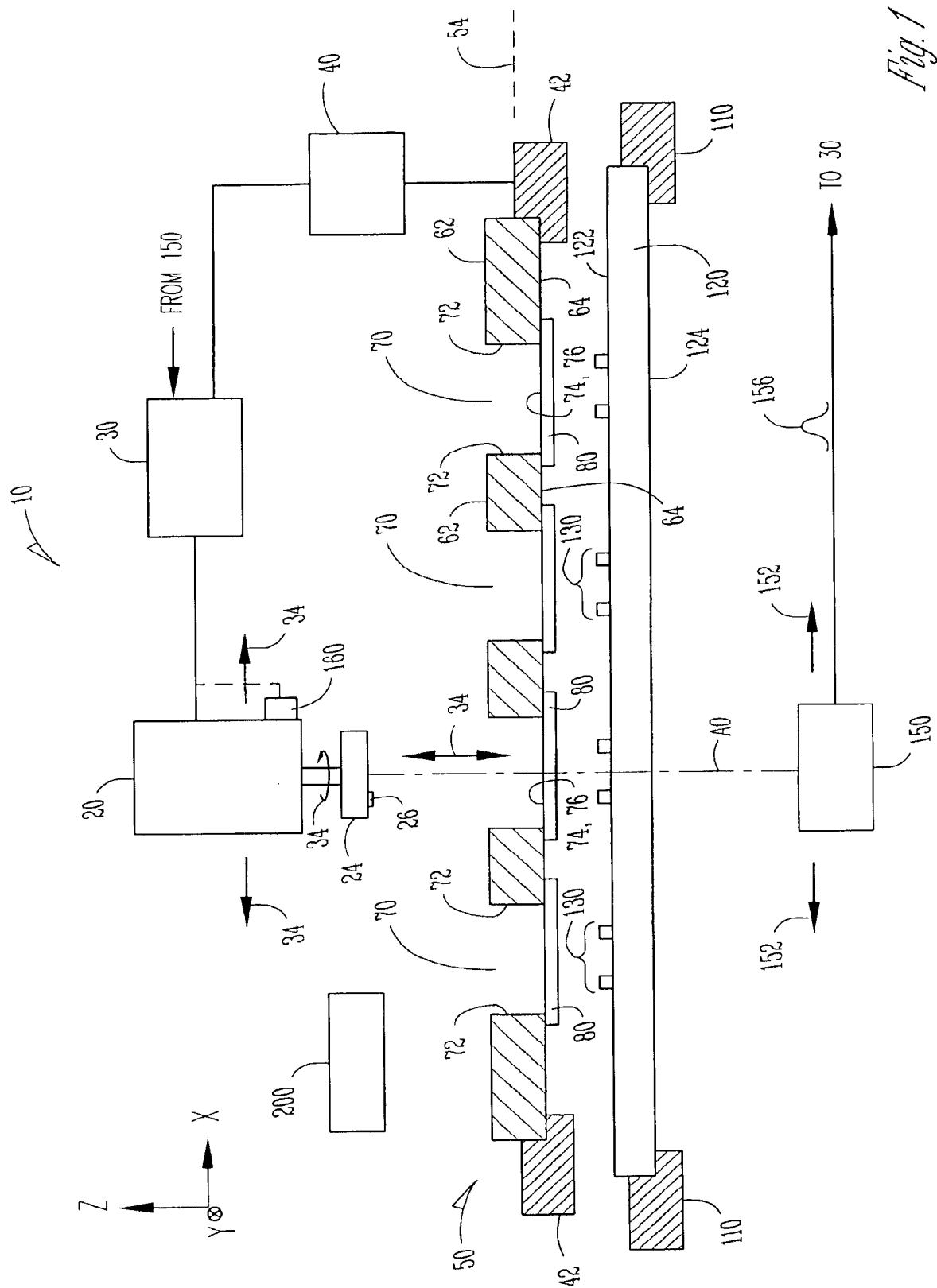
FIG. 1 is a combination cross-sectional and schematic view of a die placement apparatus according to the present invention, illustrating the use of the transparent plate with fiducials of the present invention.

FIG. 1 shows a die placement apparatus 10 that includes a pick-up head 20 capable of holding, positioning and releasing a die 24. Die 24 includes an alignment mark 26. The die alignment mark may be any shape or size as long as it can be imaged by an optical vision system. Further, the die alignment mark need not be specialized marks, i.e., it can be a feature or other indicia that may not have been originally intended as an alignment mark. Also, a die alignment mark can consist of one or more identical or different features. Pick-up head 20 is electrically connected to a controller 30 that controls the movement (as indicated by arrows 34) and operation of the pick-up head.

Apparatus 10 also includes a panel support system 40 with support arms 42 capable of movably supporting a thin rectangular die-bearing panel 50. Support arms 42 support the panel at panel edges 52 and hold the panel in a panel support plane 54 beneath the pick-up head. Panel support system 40 is also electrically connected to controller 30, which controls the movement of support arms 42 and thus the movement of the panel.

Figure 2:
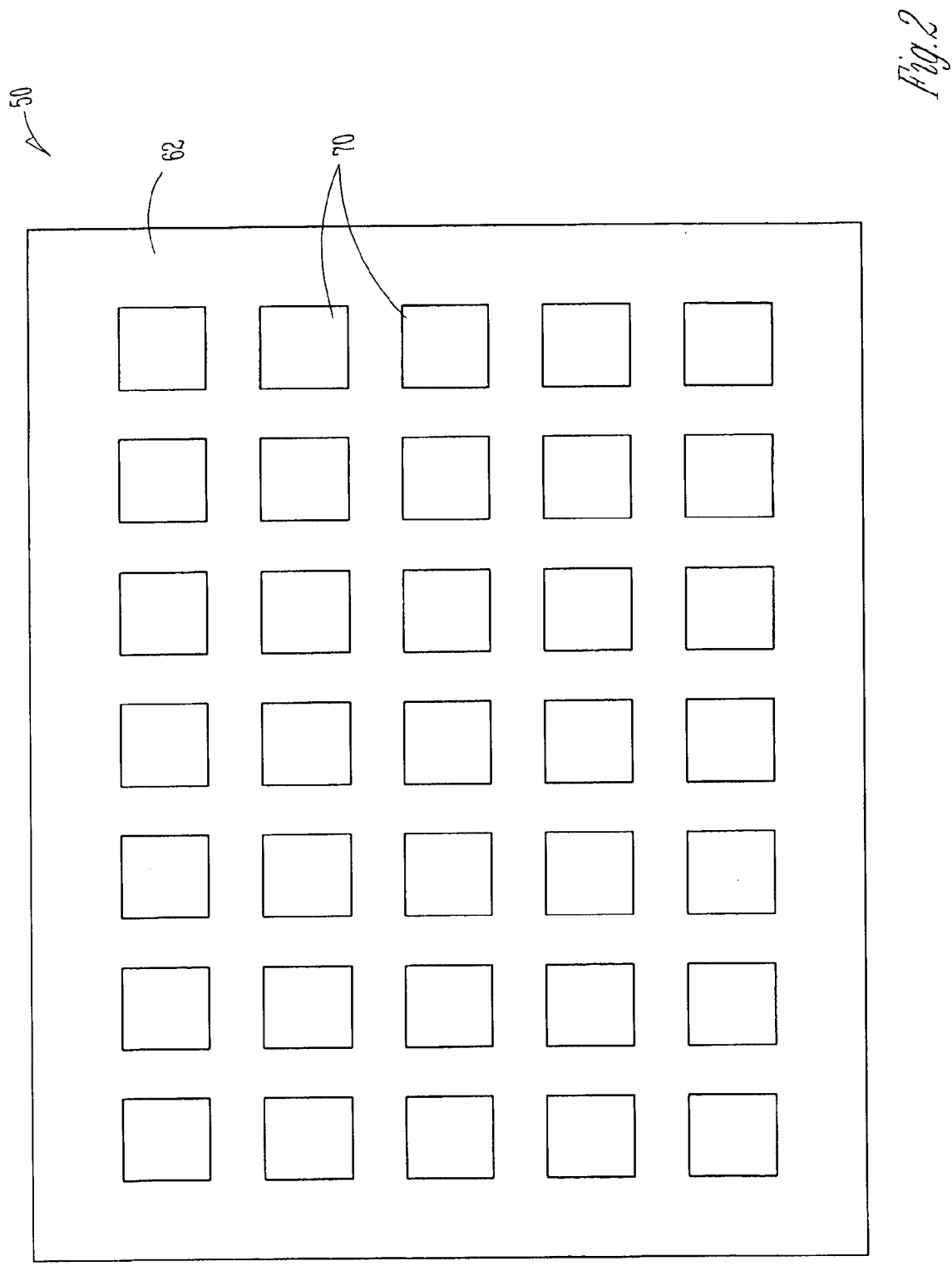
FIG. 2 is a face-on view of an example panel used in the die placement apparatus of FIG. 1.

With reference also to FIG. 2, panel 50 includes opposing upper and lower surfaces 62 and 64 and a number of cavities 70 formed in the upper surface. Each cavity includes walls 72 and a bottom 74. The latter is formed by a portion of an upper surface 76 of a transparent segment 80 attached to bottom surface 64. In an example embodiment, transparent segments 80 are formed from an adhesive member, such as adhesive tape, so that cavity bottom 74 is adhesive. Transparent segment 80 serves as a window at the bottom of the cavity.

In an example embodiment, panel 50 is about 340 mm by 255 mm and includes a 5×7 array of square cavities 70 each 25 mm on a side. The positions of the cavities are accurate to about +/−0.1 mm on-center. However, the cavities are made larger enough (e.g., 1 to 2 mm wider than the width of the die) so that the accuracy of the placement of dies within the cavities is not limited by the cavity position error.

Apparatus 10 also includes transparent plate support member 110 capable of supporting a transparent plate 120 directly beneath panel 50. Transparent plate 120 has opposing upper and lower surfaces 122 and 124. In an example embodiment, the separation between panel lower surface 64 and transparent plate upper surface 122 is anywhere between about 1 mm to about 3 mm. In an example embodiment, transparent plate 120 is made of glass. In a further example embodiment, the glass is quartz. In another example embodiment, the plate is a standard photolithography mask blank.

Figure 3:
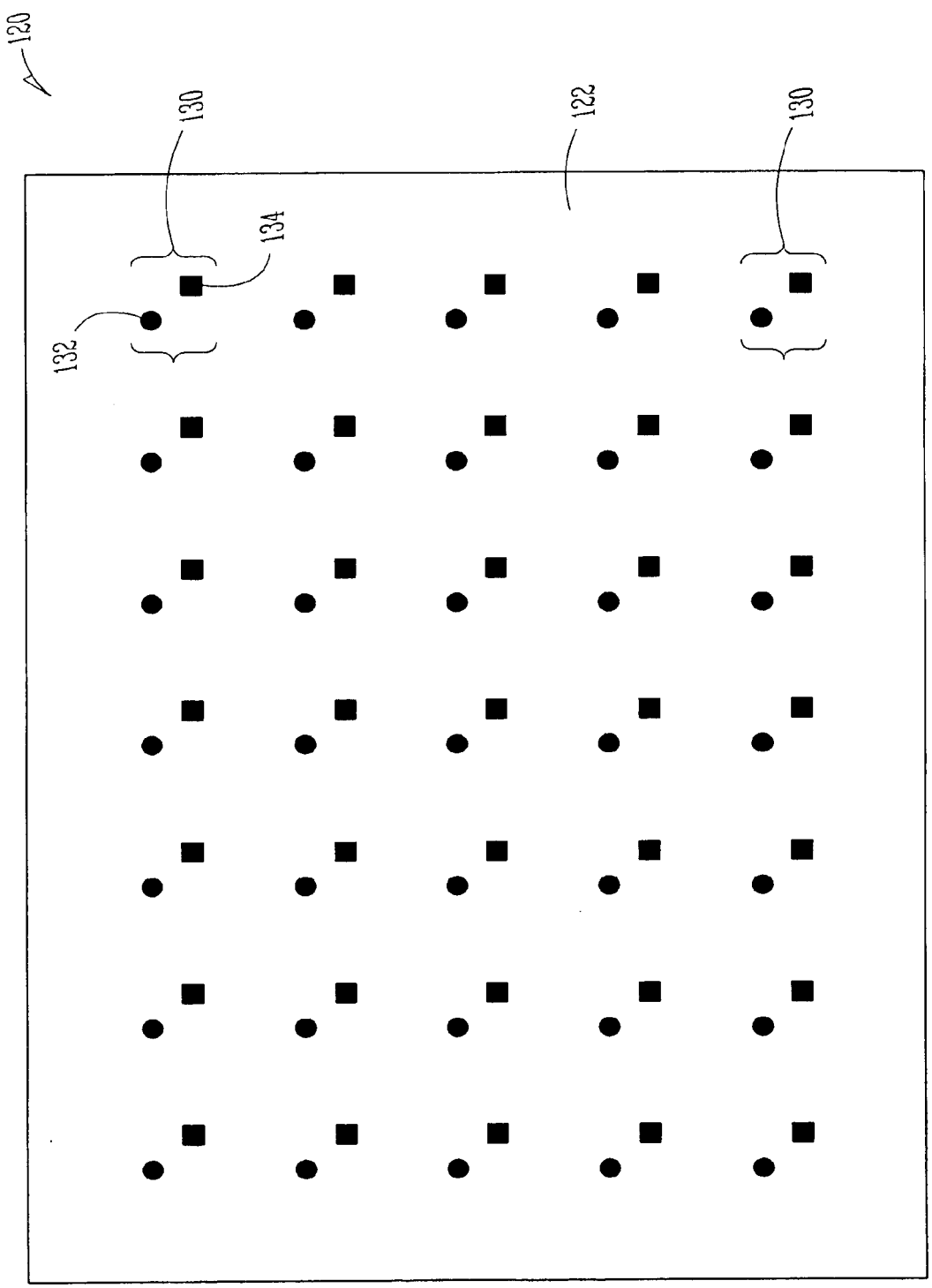
FIG. 3 is a face-on view of the transparent plate with fiducials of the present invention, illustrating an arrangement of fiducials on the upper surface.

FIG. 3 is a face-on view of transparent plate 120. The transparent plate includes an array of fiducials 130. Generally, the fiducials can be any shape and size, as long as they can be detected by an optical vision system. In an example embodiment, fiducials 130 are formed from an opaque material, such as chrome. In one example embodiment, a fiducial is a single mark or feature. In another example embodiment, a fiducial is made up of two or more features, such as for example a dot 132 and a square 134 as illustrated in FIG. 3. In yet another example embodiment, the fiducials have a spacing equal to twice that of the cavity width so that the fiducials can be aligned to the center of each cavity.

Further in an example embodiment, the fiducials are formed using the same or similar techniques used to pattern photolithographic masks. One such technique utilizes electron-beam lithography, which can provide highly accurate placement of the fiducials, i.e., to about 1 to 2 microns (3 sigma). The fiducials are spaced apart to correspond to desired locations of dies within cavities 70 of panel 50.

Apparatus 10 further includes an optical vision system 150 arranged adjacent transparent plate lower surface 124 and electrically connected to controller 30. In an example embodiment, optical vision system 150 is positioned along an axis A0 joining the optical vision system with pick-up head 20, and moves along with the pick-up head in the x-y plane, as indicated by arrows 152. Optical vision system 150 is adapted to simultaneously image at least one of fiducials 130 and die alignment mark 26, the latter being imaged through transparent segment 80. The optical vision system 150 is further adapted to provide an electrical signal 156 to controller 30. The electrical signal corresponds to the position of the die relative to the fiducial corresponding to the cavity through which the die alignment mark is imaged. The fiducial corresponding to a select cavity is referred to herein as a "local fiducial."

In another example embodiment, apparatus 10 includes an optical vision system 160 that is attached to or that moves with pick-up head 20. Optical vision system is arranged so that it can image the fiducials through cavities 70.

Method of Operation

Figure 4:
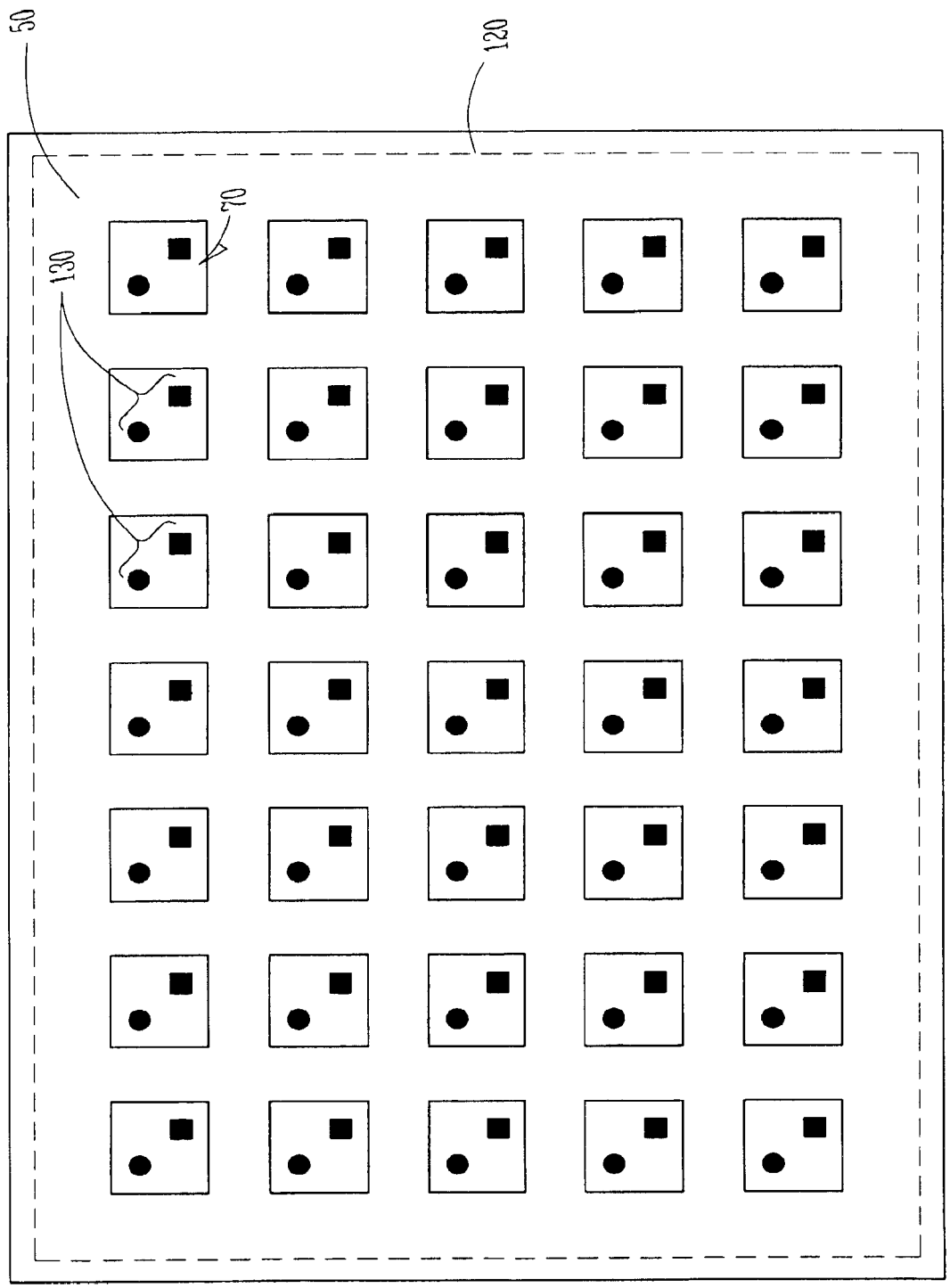
FIG. 4 is a face-on view of the panel of FIG. 2, with the transparent plate of FIG. 3 arranged beneath the panel such that the fiducials are aligned with the panel cavities.

With continuing reference to FIG. 1, the method of accurately placing dies within the panel proceeds as follows. First, transparent plate 120 is arranged in transparent plate support member 40 of apparatus 10 at a set location. Panel 50 is then moved so that each fiducial 130 is aligned with a corresponding cavity 70, thereby establishing local fiducials for each cavity (FIG. 4). In an example embodiment, the local fiducials are aligned to the center of each cavity.

Pick-up head 20 then picks up a die from a die bin 200 that contains a number of dies to be placed onto the panel. The pick-up head moves until optical vision system 150 views the die alignment mark through a select transparent cavity bottom (i.e., transparent segment 80) while also viewing the local fiducial through the transparent plate.

Alternatively, the pick-up head moves until optical vision system 160 views one of the local fiducials. In this embodiment, the alignment mark on the die is at a known distance from optical vision system 160 so that determining the location of the local fiducial with optical vision system 160 provides the needed information for centering the die to the cavity center.

Optical vision system 150 images the local fiducial and the alignment mark and generates electrical signal 156 corresponding to the position of the die alignment mark relative to the local fiducial. The electrical signal is provided to controller 30, which moves the pick-up head until proper alignment of the die with respect to the local fiducial (and hence the select cavity) is attained.

Figure 5:
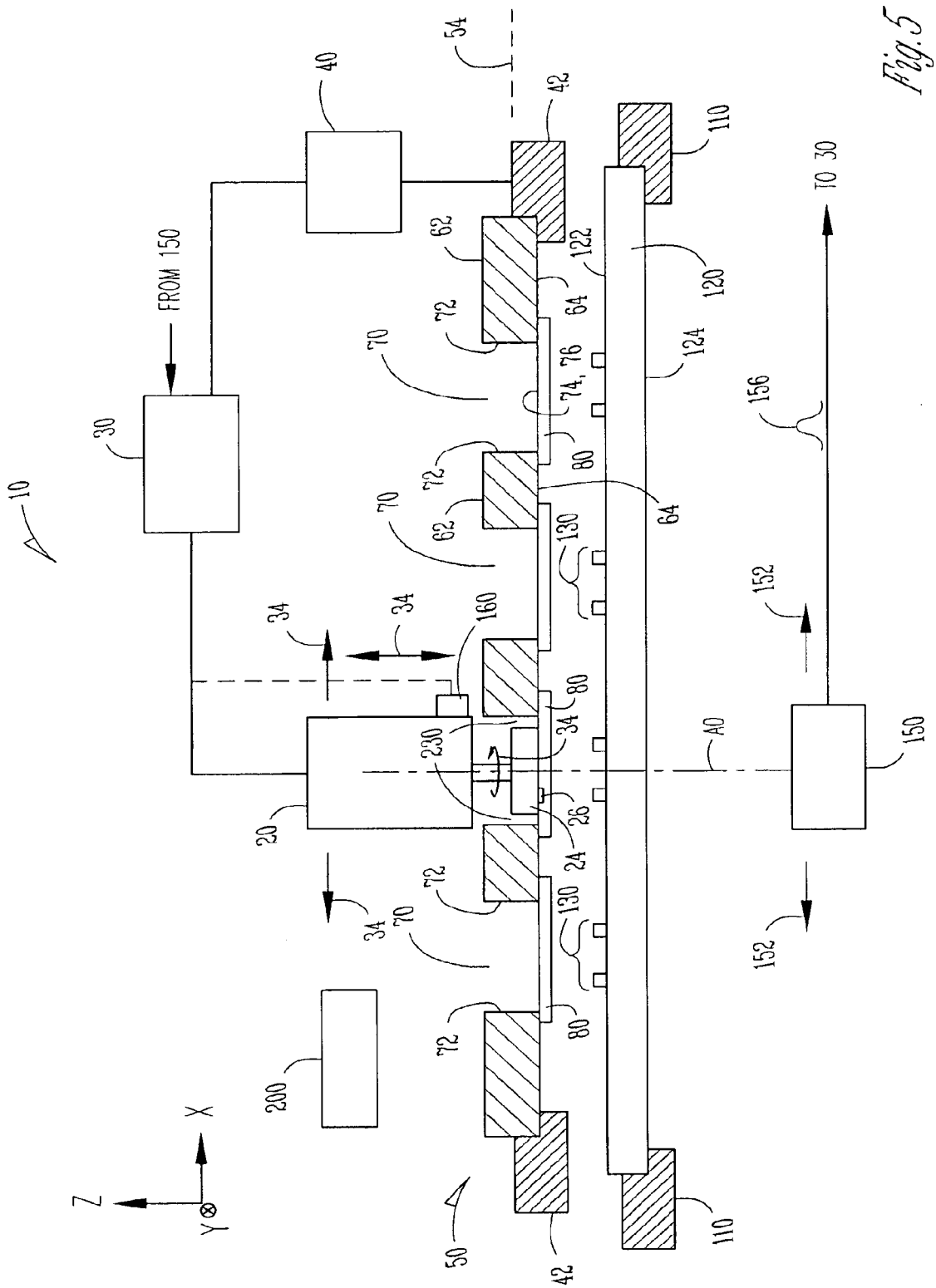
FIG. 5 is the apparatus of FIG. 1, shown placing a die into a select cavity in the panel and onto the bottom transparent surface.
Figure 6:
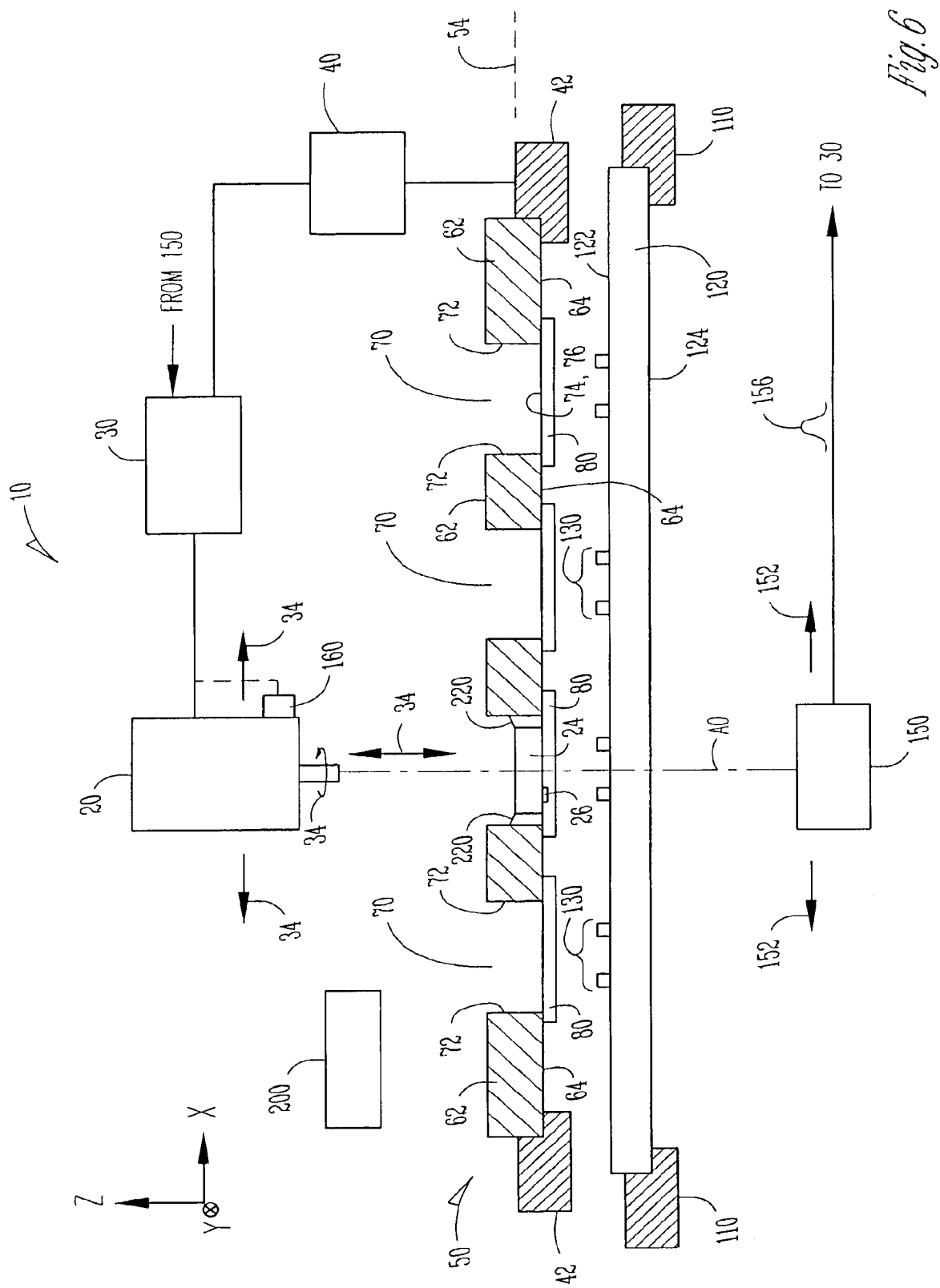
FIG. 6 is the same as FIG. 5, but with the pick-up head retracted and the gaps in the cavity between the die and cavity walls filled with epoxy.

Once alignment of the die relative to the cavity is attained, controller 30 instructs the pick-up head to move toward the panel. The pick-up head then places the die on bottom surface 74 of the select cavity as illustrated in FIG. 5. As mentioned above, the bottom surface is adhesive in an example embodiment, so that the die is fixed in place. The pick-up head then releases the die, as shown in FIG. 6. The above process is repeated until each cavity designated to receive a die has received a die.

An encapsulation step is then performed wherein an epoxy 220 is used to fill the gap 230 (FIG. 5) between each die 24 and cavity walls 72 (FIG. 6). When the epoxy cures, the dies are fixed within the cavities at very accurate positions relative to one another. In example embodiment, the placement accuracy of the dies is 2 microns (3 sigma) or less. Thus, further lithography steps requiring accurate alignment of the dies can be carried out. Such lithographic steps include steps for bump lithography, which includes forming a print solder resist layer and selectively exposing and processing the resist layer to form plate metal traces to electrically connect the dies.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. An apparatus comprising:
   a transparent plate having fiducials on a surface, the transparent plate adapted to be positioned beneath a panel having a plurality of transparent segments so that a die suspended above the panel and having a die alignment mark can be aligned and positioned on one of the transparent segments relative to at least one of the fiducials.

2. The apparatus of claim 1, wherein the transparent plate is glass.

3. The apparatus of claim 2, wherein the glass is quartz.

4. The apparatus of claim 1, wherein the fiducials are chrome.

5. An apparatus comprising:
   a movable pick-up head capable of holding, positioning and releasing a die, the die having an alignment mark;
   a panel support member adapted to movably support a panel in a panel support plane, the panel having upper and lower surfaces and an array of cavities each open at the upper surface and each having a transparent bottom;
   a transparent plate with fiducials arranged at locations corresponding to desired die locations on the transparent bottoms of the cavities of the panel, the transparent plate arranged adjacent the panel support plane opposite the panel from the movable pick-up head; and
   an optical vision system adapted to image a die through the transparent plate and through the transparent bottom of one of the cavities and to image at least one fiducial and generate an electrical signal corresponding to the position of the at least one fiducial.

6. The apparatus of claim 5, further including a controller electrically connected to the pick-up head and the optical vision system, the controller adapted to control the movement of the pick-up head in response to the electrical signal.

7. The apparatus of claim 5, wherein the transparent plate is made of glass.

8. The apparatus of claim 6, wherein the glass is quartz.

9. The apparatus of claim 5, wherein the fiducials are formed by electron-beam lithography.

10. A method comprising:

providing a panel with a plurality of cavities, each cavity including an opening to a panel upper surface and a transparent bottom at a panel lower surface;

arranging adjacent the panel lower surface a transparent plate having an upper surface with a plurality of fiducials formed thereon, with one fiducial aligned with the each cavity transparent bottom and serving as a local fiducial; and imaging the local fiducial to align a die to one of the cavities.

11. The method of claim 10, further including determining a position of the die relative to the local fiducial based on said imaging.

12. The method of claim 11, including generating an electrical signal corresponding to the die position relative to the local fiducial.

13. The method of claim 12, further including aligning the die with the local fiducial.

14. The method of claim 13, further including:

inserting the die into the opening of the cavity associated with the local fiducial; and contacting the die to the transparent bottom.

15. The method of claim 10, including forming the fiducials using electron-beam lithography.

16. A method comprising:

forming fiducials on an upper surface of a transparent plate;

arranging the transparent plate relative to a panel having multiple cavities formed in a panel upper surface, with each cavity having a transparent bottom, said arranging including aligning each fiducial beneath a corresponding one of the multiple cavities; and imaging a select one of the fiducials corresponding to a select one of the cavities to establish a die position relative to the select one of the cavities.

17. The method of claim 16, including making the transparent bottom adhesive.

18. The method of claim 16, including aligning the die alignment mark to the select fiducial.

19. The method of claim 16, including imaging the die alignment mark through the transparent bottom.

20. The method of claim 18, further including placing the die onto the transparent bottom of the select cavity.

21. An apparatus comprising:

a panel support member adapted to support a panel in a panel support plane, the panel having upper and lower surfaces and an array of cavities each open at the upper surface and each having a transparent bottom;

means for aligning a die with respect to one of the cavities.

transparent fiducial means for providing alignment indicia; and optical imaging means for obtaining position data for the die and the alignment indicia.

22. The apparatus of claim 21, wherein the optical imaging means obtains images through the transparent fiducial means and the transparent bottom.

* * * * *

UNITED STATES PATENT AND TRADEMARK OFFICE
CERTIFICATE OF CORRECTION

PATENT NO. : 6,954,272 B2  Page 1 of 1
DATED : October 11, 2005
INVENTOR(S) : Lam et al.

It is certified that error appears in the above-identified patent and that said Letters Patent is hereby corrected as shown below:

Column 4,
Line 48, after "is" insert -- made of --.

Column 5,
Line 19, after "thereon, with" insert -- at least --.
Line 23, insert -- plurality of -- before "cavities".

Column 6,
Line 28, delete "cavities." and insert -- cavities; --.

Signed and Sealed this

Fourteenth Day of February, 2006

JON W. DUDAS
*Director of the United States Patent and Trademark Office*